(12) United States Patent
Schaffner

(10) Patent No.: US 7,177,265 B1
(45) Date of Patent: Feb. 13, 2007

(54) ITERATIVE METHOD, AND APPARATUS FOR ACQUIRING TIME AND FREQUENCY SYNCHRONIZATION IN A DSSS RECEIVER

(75) Inventor: Terry Michael Schaffner, Palatine, IL (US)

(73) Assignee: Digi International Inc., Minnetonka, MN (US)

( * ) Notice: Subject to any disclaimer, the term of this patent is extended or adjusted under 35 U.S.C. 154(b) by 910 days.

(21) Appl. No.: 10/050,462

(22) Filed: Jan. 15, 2002

(51) Int. Cl.
*H04J 11/00* (2006.01)

(52) U.S. Cl. .................. 370/208; 370/342; 375/144; 375/347; 375/350

(58) Field of Classification Search ............... 370/208, 370/342; 375/130, 144–146, 346, 347, 350
See application file for complete search history.

(56) References Cited

U.S. PATENT DOCUMENTS 5,903,550 A * 5/1999 Spock ................. 370/335
6,522,683 B1 * 2/2003 Smee et al. ............. 375/144
2005/0169295 A1 * 8/2005 Yun et al. ............... 370/437

OTHER PUBLICATIONS

TR45 -Mobile Station-Base Station Compatibility Standard for Dual-Mode Spread Spectrum Systems, Oct. 1, 1998, To be published as TIA/EIA-95-B 16 pp. (See pp. 7-3-7-4).

3rd Generation Partnership Project; Technical Specification Group Radio Access Network; Spreading and modulation (FDD) Release 1999, 28 pp. (See pp. 8 & 9).

* cited by examiner

*Primary Examiner*—John Pezzlo
*Assistant Examiner*—Inder Pal Mehra
(74) *Attorney, Agent, or Firm*—Heimlich Law; Alan Heimlich, Esq.

(57) ABSTRACT

A method and apparatus for acquiring time and frequency synchronization in a DSSS receiver are disclosed. An iterative approach is used in acquiring a DSSS signal when the phase coherency of the signal is less than the symbol length.

36 Claims, 6 Drawing Sheets

ITERATIVE METHOD, AND APPARATUS FOR ACQUIRING TIME AND FREQUENCY SYNCHRONIZATION IN A DSSS RECEIVER

FIELD OF THE INVENTION

The present invention pertains to frequency synchronization. More particularly, the present invention relates to frequency synchronization in a direct sequence spread spectrum (DSSS) communication system.

BACKGROUND OF THE INVENTION

In a communications system, the need to synchronize with a frequency is important for operation of, for example, a demodulator. Some communication systems explicitly provide a signal for such synchronization. An explicit approach may consume bandwidth, and in a bandwidth limited environment may not be advantageous. One form of such an approach is to send a pilot signal. This pilot signal may be an unmodulated reference signal.

Other forms of communication allow for recovery of a frequency for synchronization purposes from the received data stream and/or modulated signal. This approach requires less bandwidth, however recovery of the frequency may be more complex. The acquisition of a frequency from such approaches may have a problem when the initial frequency offset is large. There is also a problem in DSSS systems when the phase coherency of a signal is less than the symbol length. That is, a large frequency offset may prevent the receiver from being able to search for the signal by correlating over the length of the transmit symbol period.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An iterative method, and apparatus for acquiring time and frequency synchronization in a direct sequence spread spectrum (DSSS) receiver are described.

In the explanation below symbols and terms are used as a shorthand to express information. These are listed below and will be understood by those skilled in the art.

%=modulo operator

⌊ ⌋=floor function (returns an integer-any fractional portion is removed)

$Pn_i$=PN (Pseudo Noise) sequence, bit position i; 0 mapped to +1, 1 mapped to −1

$W_i$=Walsh sequence, bit position i; 0 mapped to +1, 1 mapped to −1

$R_i$=Received baseband complex data at time sample i

M=PN sequence length

Figure 1:
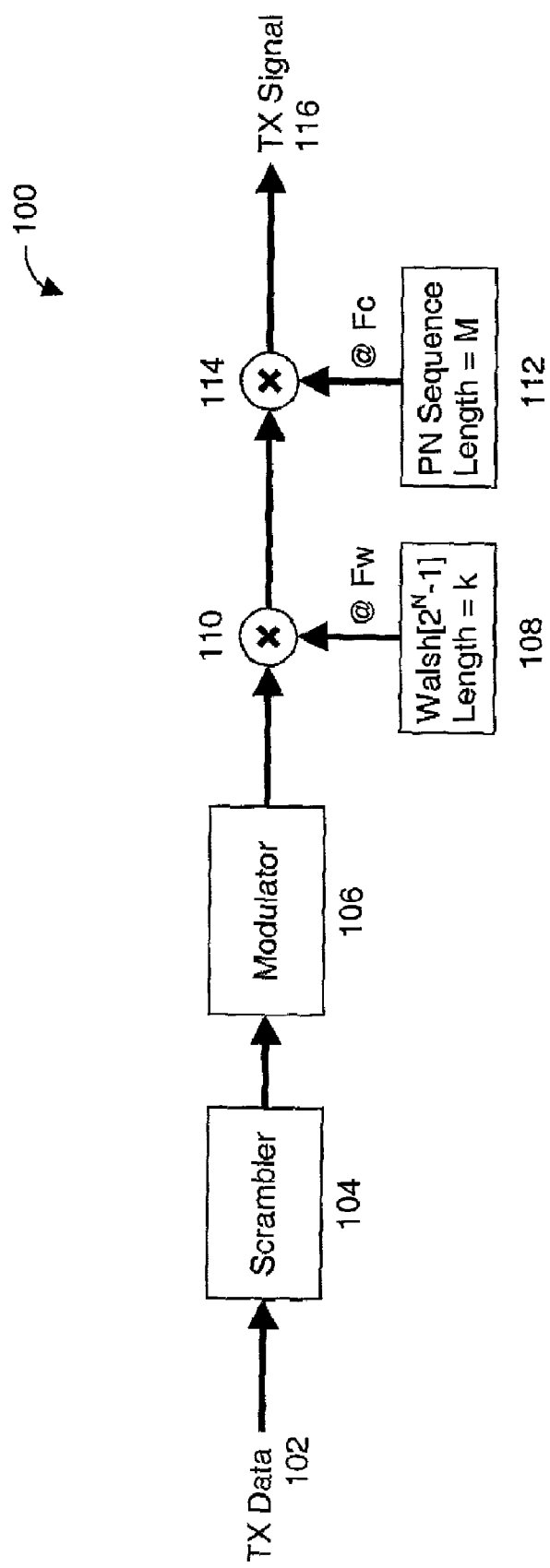
FIG. 1 illustrates one embodiment of a transmitter structure.

N=Walsh sequence length k=Walsh sequence length used to despread the signal during iterative signal acquisition; k<=N Fw is the Walsh chip rate Fc is the PN chip rate FIG. 1 illustrates one embodiment of a transmitter structure 100. The Direct Sequence Spread Spectrum (DSSS) transmitter 100 scrambles 104 and modulates 106 the transmit (TX) information data 102 (or coded information data) into transmit symbols, spreads 110 each symbol with a Walsh code 108 (@Fw is the Walsh chip rate), then further spreads 114 each Walsh chip with a pseudonoise (PN) sequence 112 (@Fc is the PN chip rate) producing a transmitter (TX) output signal 116. The Walsh code is preferably code $2^N-1$, where N is the bit length of the Walsh code. Each modulation symbol has a length of N*M chips.

The transmit signal structure (at 116) allows a receiver to perform initial acquisition of the signal without obtaining full synchronization to the transmit symbols. The benefit of this signal structure is twofold: first, the receiver only has to search over a space of M chips (as opposed to M*N chips) to initially acquire the signal, and second, the structure facilitates iterative convergence upon the time and frequency offset of the signal at the receiver. The receiver searches for the transmit signal by correlating the received data with a replica of the transmit PN sequence reference. If the receiver has no apriori knowledge of the received signal's timing, the receiver has 2M possible time offsets to search (assuming ½ chip search resolution). The correlation energy of a number of results may be summed together in order to enhance the signal to noise ratio of the final search statistic.

After the receiver initially acquires the signal the PN sequence alignment to the received signal is known, however, the Walsh sequence alignment is unknown. In order to obtain alignment to the Walsh sequence a partial correlation is performed with the receive data. The code sequence Walsh $2^N-1$ was chosen as the cover code because of its superior partial correlation properties. When a cross correlation is performed between the Walsh code and a segment of the code (of length $2^L$, where L<N), the correlation magnitude is large when the segment is aligned to the code and small when it is misaligned (offset by $2^{L-1}$). The significance of this is that synchronization to the Walsh code of length $2^N$ can be performed in a sequential manner. The code is first correlated to the same code of length $2^0$, then to a length of $2^1$, then $2^2$, and so on.

The frequency offset of the received signal relative to the receiver's local oscillator may be estimated by computing the phase difference between the first half of the PN sequence correlation and the second half of the PN sequence correlation. No aliasing occurs as long as the maximum frequency offset does not exceed ±Fc/2M, where Fc is the PN chip rate and M is the length of the PN code. The frequency estimates feed an Automatic Frequency Control (AFC) loop that provides frequency offset correction of the received signal. After the AFC has sufficiently converged to the frequency offset, the symbol timing estimation can begin.

Figure 2:
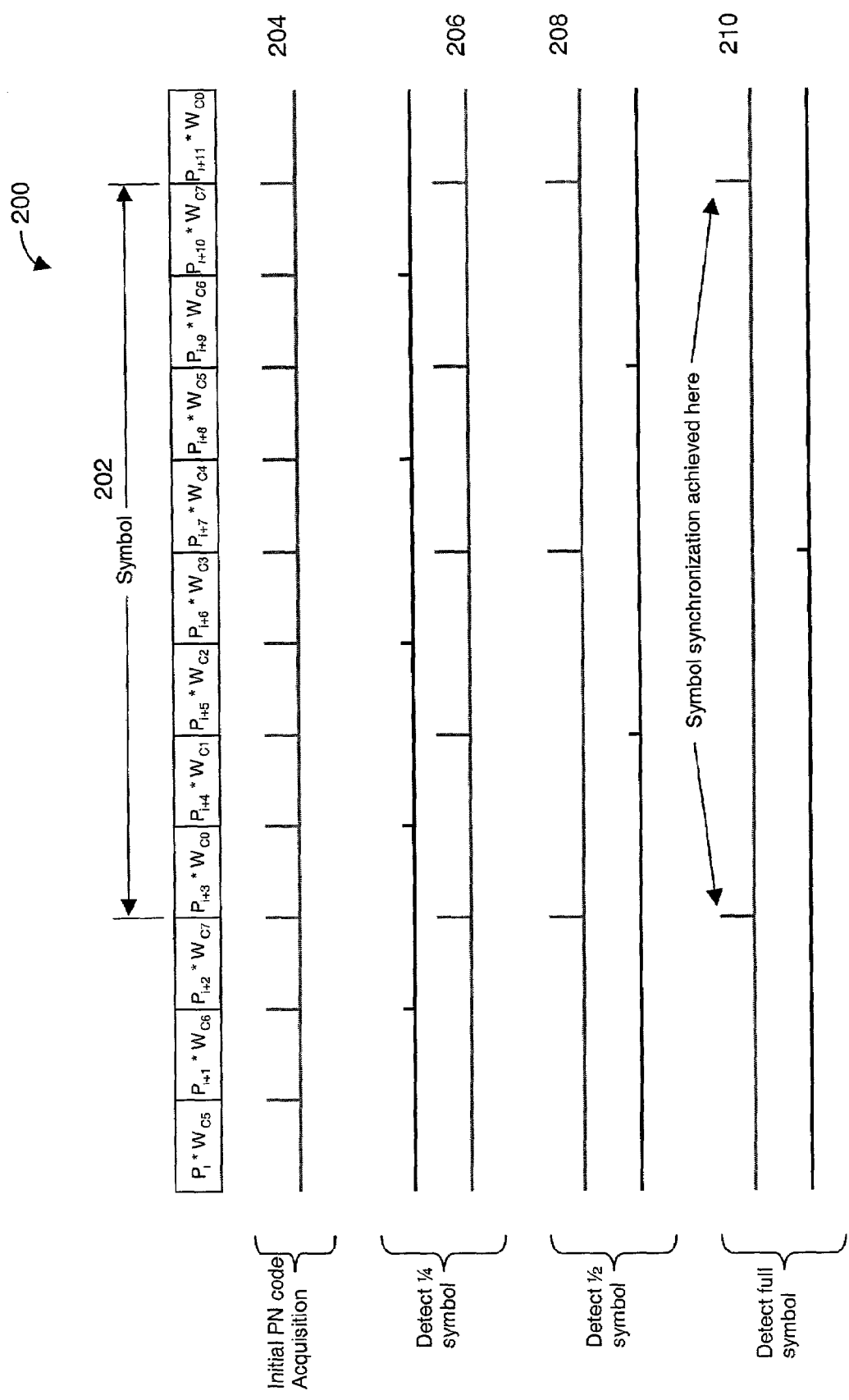
FIG. 2 illustrates one example of iterative symbol synchronization.

The diagram in FIG. 2 illustrates one iterative symbol synchronization scheme 200. In this example, the Walsh code length N, is equal to 8 ($2^3$). Three symbol timing decisions (at 206, 208, and 210) are required to obtain symbol synchronization to the received signal (symbol 202). The vertical lines are indicative of the average energy of the partial cross correlations with the Walsh sequence at a given point in time (taller lines indicate more energy). The winning correlations are 206 at detect ¼ symbol, 208 at detect ½ symbol, and 210 at detect full symbol.

After initial acquisition and frequency offset convergence, timing synchronization is determined with a granularity of 2 Walsh chips by correlating the received data with the truncated Walsh code index $2^N-1$ of length 2 (actually Walsh index $2^1-1=1$, or the sequence $\{0,1\}$). This is accomplished by computing a difference metric between each pair of Walsh bits. There are two possible time offset candidates; the time offset having the highest correlation energy is chosen as the newly decided Walsh boundary.

The receiver then progresses to the next stage of synchronization. The received signal is now despread with a Walsh code of length 2 (Walsh index 1) using the Walsh timing determined by the first stage of synchronization. Again, the AFC loop is allowed to operate for a while to converge upon a more accurate frequency offset estimate. At this stage the frequency offset estimate is based upon phase difference measurements made upon the received signal integrated over a full Walsh chip (as opposed to ½ Walsh chip for the first stage). Timing synchronization is now determined with a granularity of 4 Walsh chips by correlating the received data with the truncated Walsh code index $2^N-1$ of length 4 (which is actually Walsh index $2^2-1=3$, or the sequence $\{0,1,1,0\}$). The receiver accomplishes this by summing two of the despread Walsh chips (despread by the sequence $\{0,1\}$) and subtracting the next sum to create the difference metric. Again, there are two possible time offsets and the receiver chooses the one resulting in the highest correlation.

The receiver repeats this process until it achieves timing synchronization with the full length ($2^N$) of the Walsh symbol. At each stage the receiver narrows the set of possible Walsh boundaries and refines the accuracy of the frequency offset estimate. In order to make a reliable timing decision at the last stage, the receiver requires symbol data transitions to take place. A scrambler is employed at the transmitter in order to ensure a good distribution of 1s and 0s in the symbol data.

The frequency offset estimate is computed by calculating a delta phase estimate between the signal $X_0(t)$ and $X_1(t)$ where, $$X_0(t) = \sum_{i=0}^{k-1} (PN_{i\%M} * W_{\lfloor i/M \rfloor} * r_{i+t}) \qquad (1)$$

$$X_1(t) = \sum_{i=k}^{2k-1} (PN_{i\%M} * W_{\lfloor i/M \rfloor} * r_{i+t})$$

and, k=M/2, M, 2M, . . . , (N/2)M

The coherent accumulation period, k, begins at half the PN sequence length then doubles for each iteration until it reaches half the transmit symbol period. At each iteration the receiver determines the proper Walsh code timing alignment in order to permit coherent despreading with a known sequence.

For each stage of synchronization the AFC operates to refine the frequency offset estimate. As synchronization is achieved on larger portions of the transmit symbol, the despreader coherently accumulates more receive symbol chips. This results in a reduced sampling rate into the frequency estimator and an increased SNR of the sample data. The increased SNR allows the AFC to converge to a more accurate estimate of the frequency offset. The AFC includes a feedback loop that corrects the frequency offset before the demodulator despreads the received signal. Therefore, the frequency offset seen by the demodulator diminishes with each synchronization stage. The reduced frequency offset is necessary to ensure that aliasing does not occur at the next synchronization stage and to minimize coherent combining losses due to phase shift. Upon obtaining a more accurate frequency offset estimate, the receiver can progress to the next stage of synchronization where the frequency offset estimate is further refined.

The receiver computes two decision metrics, $Y_0$ and $Y_1$, and chooses the one with the largest value to determine symbol synchronization. The decision is made when a sufficient number of difference energies have been summed (the value R). Following the partial symbol synchronization decision, the variable k increments to the next value as the next iteration begins. The iterations continue until k is equal to (N/2)M at which time full symbol synchronization is achieved. The decision metrics $Z_0$ and $Z_1$ are given by, $$Y(t) = X_0(t) + X_1(t) \qquad (2)$$

$$Z_0 = \sum_{r=0}^{R-1} (Y[2k*(2r)] - Y[2k*(2r+1)])^2$$

$$Z_1 = \sum_{r=0}^{R-1} (Y[2k*(2r+1)] - Y[2k*(2r+2)])^2$$

Figure 3:
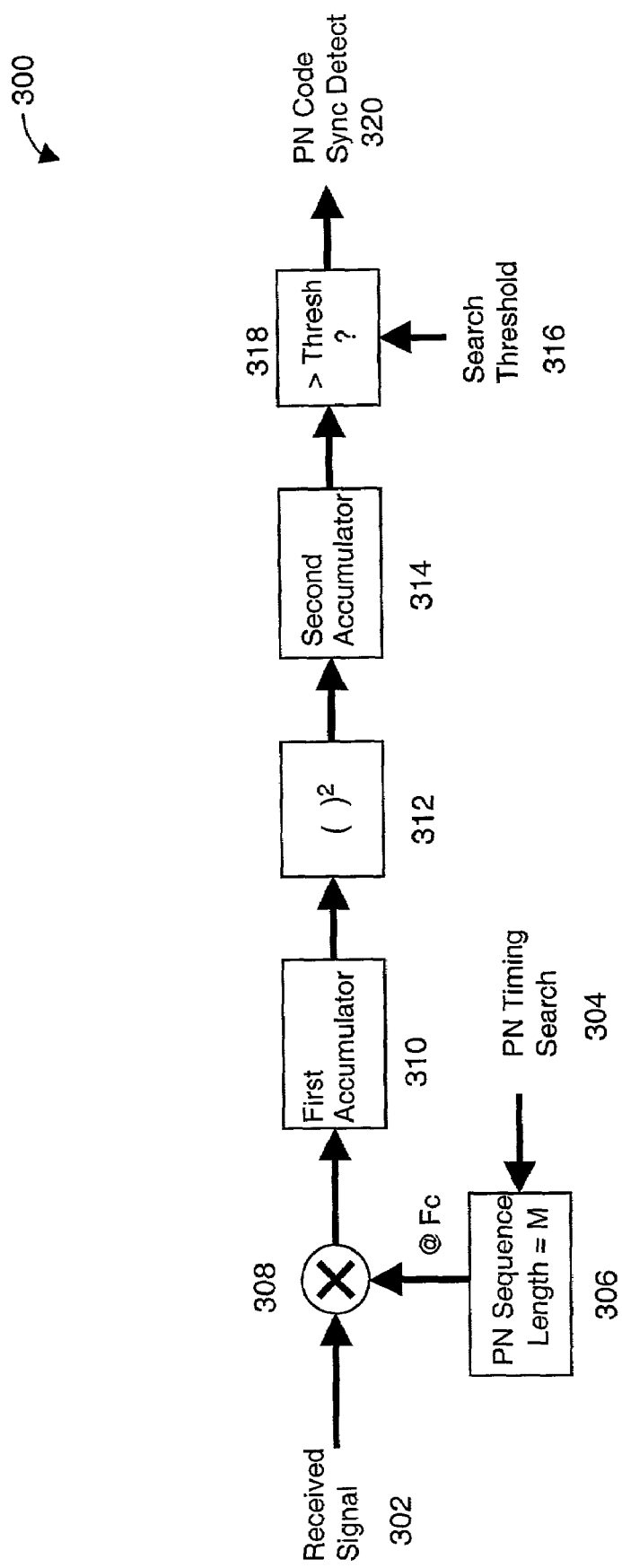
FIG. 3 illustrates one embodiment of PN code acquisition.

A high level block diagram of the PN code acquisition operation is shown in FIG. 3. The received signal 302 is a complex baseband signal created from downconverting the received RF signal. The received signal 302 is first despread by multiplier 308 with the same length M PN sequence 306 that was used in the transmitter to spread the signal (@Fc is the PN chip rate). The despread data is coherently accumulated by the first accumulator 310 over the length of the PN sequence correlation. The energy of the resulting correlation is then computed by the complex squaring function 312. Multiple accumulations of the energy are performed by the second accumulator 314 in order to increase the SNR of the search metric. Finally, comparator 318 compares the search metric to a threshold 316 in order to make an acquisition determination 320 (PN code sync detect). Multiple thresholds (316 and 318) and/or multiple detections (initiated at 304 PN timing search) may be required before making a positive acquisition determination.

Figure 4:
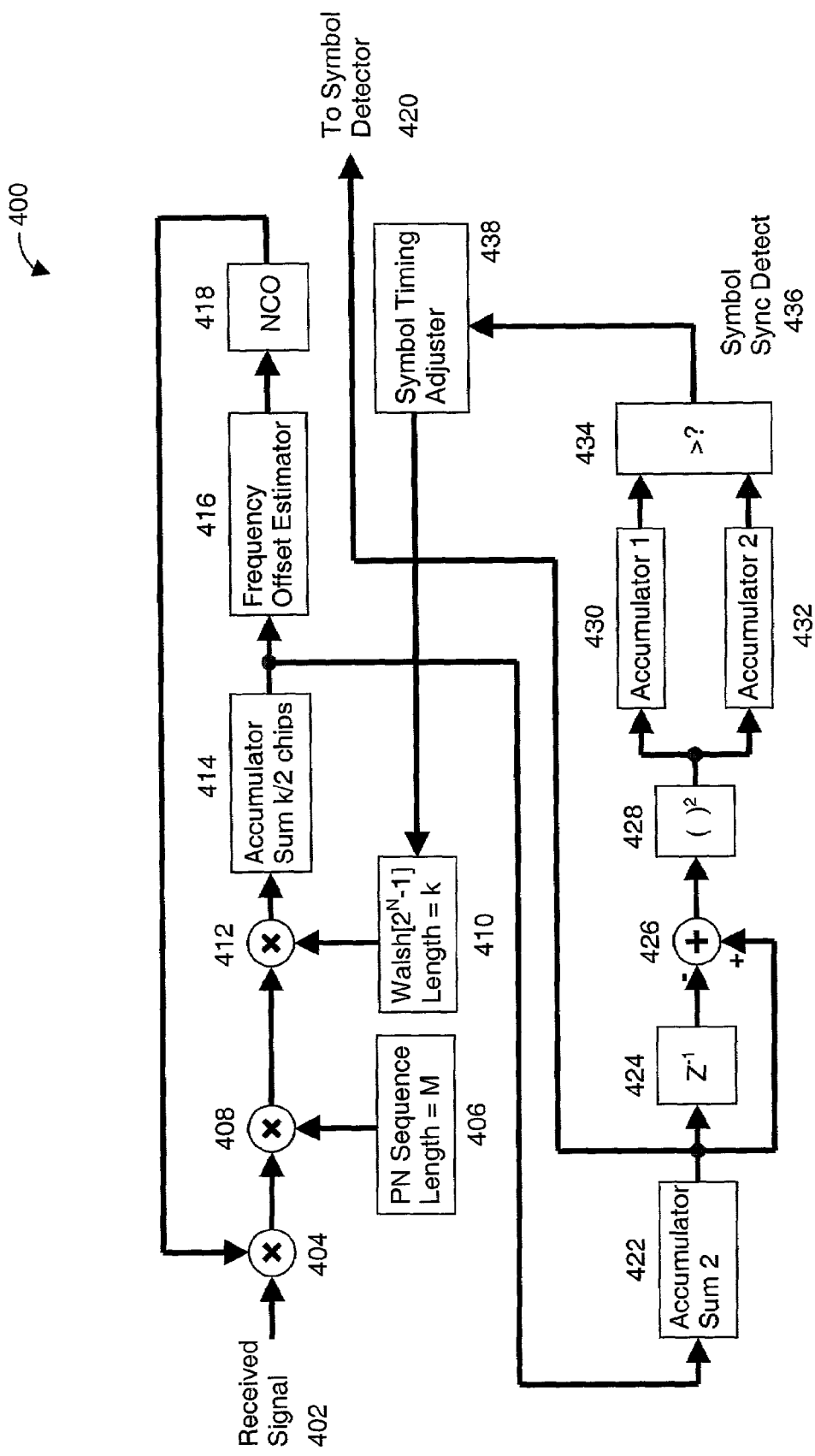
FIG. 4 illustrates one embodiment of a DSSS receiver using the described techniques.

A diagram of a DSSS receiver that employs the previously described iterative symbol synchronization procedure is shown in FIG. 4. The frequency offset estimator 416, numerically controlled oscillator (NCO) 418, and the front-end complex multiplier (404, 408, 412, and 414) form the AFC loop. The lower half (422–434) is the difference metric calculator, which feeds synchronization decisions (output from 434) to the symbol timing adjuster 436 in order to properly align the Walsh code sequence with the received signal 402.

At 402 is the received signal. The multiplier at 404 takes as inputs the received signal 402 and the output of the NCO 418. The multiplier at 408 takes as inputs the output of multiplier 404 and the PN sequence generator of Length=M 406. The multiplier at 412 takes as inputs the output of multiplier 408 and the Walsh code sequence generator of Length=k at 410. The output of multiplier 412 goes to the accumulator 414 that sums k/2 chips. The output of accumulator 414 goes to accumulator sum 2 422 and the frequency offset estimator 416. The output of the frequency offset estimator 416 goes to the NCO (Numerically Controlled Oscillator) 418. The output of accumulator sum 2 422 goes to the symbol detector 420 and a transform block ($Z^{-1}$) 424 and the positive input of adder 426. The output of the transform block ($Z^{-1}$) 424 goes to the negative input of adder 426. The output of adder 426 goes to block 428 where the power is computed ($(\ )^2$) and the output of the power computation goes to accumulator 1 430 and accumulator 2 432. The output of accumulator 1 430 and the output of accumulator 2 432 go to a comparator 434. The output of the comparator 434, which is the symbol sync detect 436, goes to the symbol timing adjuster 438. The output of the symbol timing adjuster 438 goes to the Walsh code sequence generator block 410.

Figure 5:
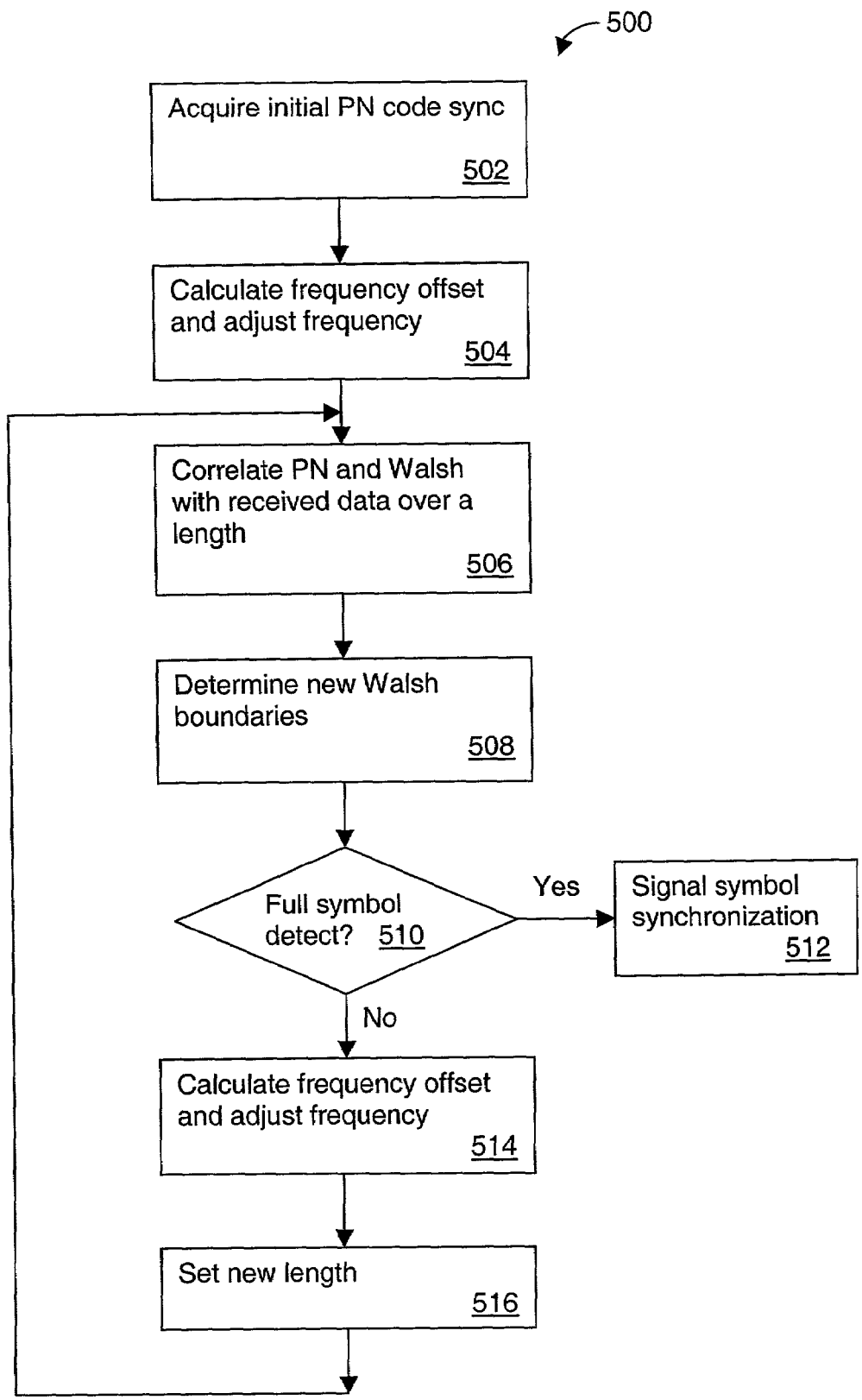
FIG. 5 is a flowchart illustrating one embodiment of iterative symbol synchronization.

FIG. 5 is a flowchart illustrating one embodiment of iterative symbol synchronization 500. At 502 initial PN code sync is obtained. At 504 a frequency offset is calculated and the frequency adjusted to reduce the offset. At 506 a correlation of the PN sequence, Walsh, and received data is performed. This correlation is performed over a length. At 508 the new Walsh boundaries are determined by choosing the highest correlation energies from 506. At 510 a decision is made whether a full symbol detection has been made. If a full symbol detection (at 510) has been made then at 512 a signal is sent indicating symbol synchronization. If a full symbol detection (at 510) has not been made then at 514, the frequency offset is calculated and an adjustment to the frequency is made. After the adjustment (at 514) a new length is set 516 which will be used at 506 for a new correlation.

Thus, the present invention discloses a transmit structure and a method at the receiver for acquiring and synchronizing to a transmit signal. The present invention provides a means for acquiring a DSSS signal when the phase coherency of the signal is less than the symbol length. For example, if the local oscillators used in the transmitter and receiver have a large frequency offset the phase may change appreciably over the time duration of a transmit symbol. This large frequency offset may prevent the receiver from being able to search for the signal by correlating over the length of the transmit symbol period. The present invention handles the phase coherency issue by gradually acquiring time and frequency synchronization using an iterative process. The invention does not require a pilot signal (i.e., an unmodulated reference signal) and may be used with various modulation waveforms such as Binary Phase Shift Keying (BPSK), Quadrature Phase Shift Keying (QPSK), and others, etc.

One skilled in the art will appreciate that other embodiments of the present invention are possible. For example, in the discussion above, in order to not obscure the present invention, the assumption was made that the receiver has no apriori knowledge of the received signal's timing, and thus the receiver has 2M possible time offsets to search (assuming ½ chip search resolution). If the received signal is sampled at twice the chip rate the search resolution will be ½ chip. However, if the sampling rate is 4× the chip rate the resolution is ¼ chip, etc. Additionally, in actual implementations, demodulation is often performed with a higher sampling rate (e.g., 4× or 8× the chip rate) in order to minimize the degradation in receiver sensitivity that occurs from not being perfectly time aligned to the received signal. For search acquisition, as the present invention pertains, the degradation is not as detrimental to receiver operation so a sampling rate of 2× the chip rate is likely sufficient. In any event, the A/D converters can still operate at 2× the chip rate. The demodulator may then incorporate an upsampling filter to effectively achieve the 4× or 8× chip rate.

Figure 6:
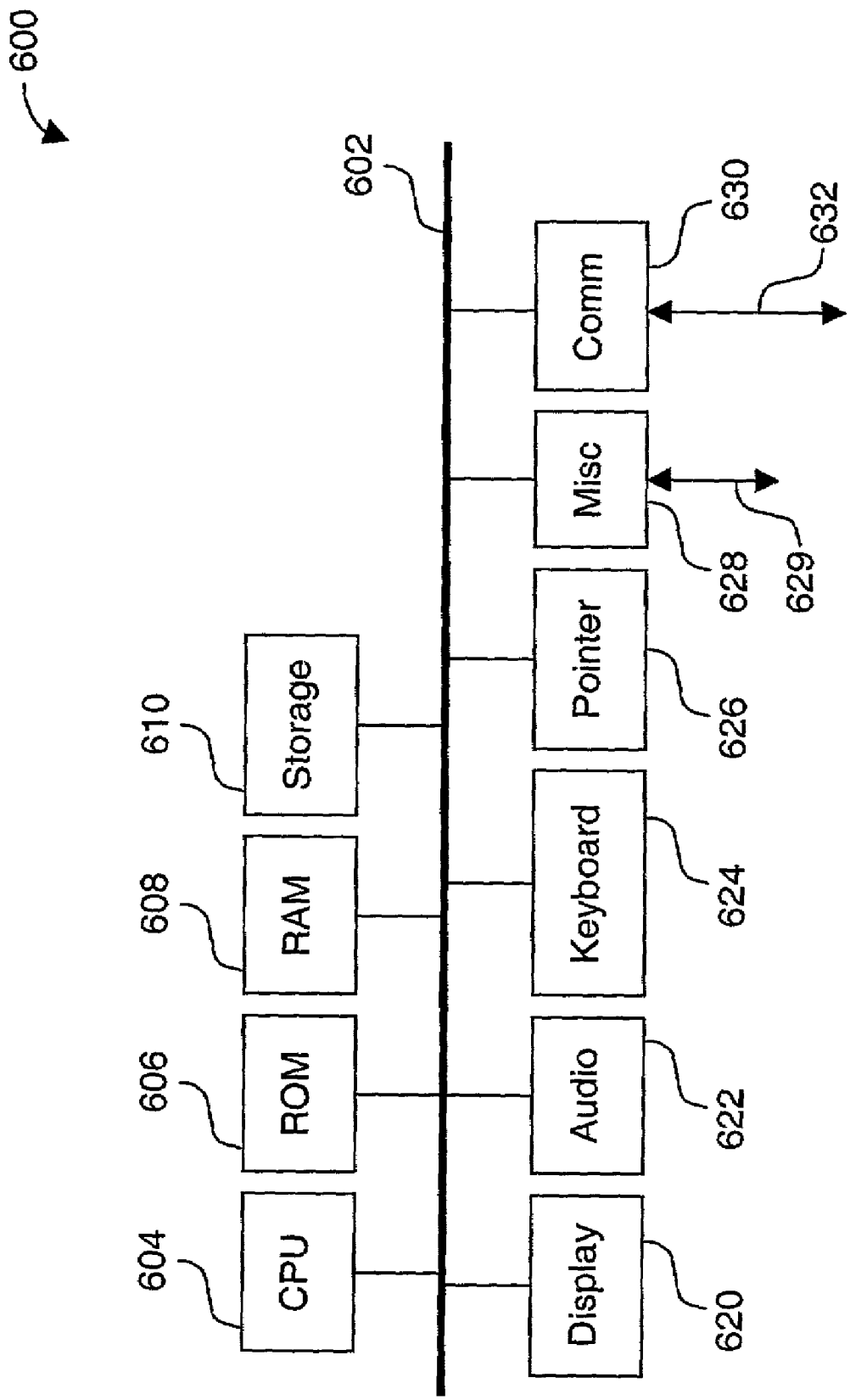
FIG. 6 is a block diagram of a computer system.

FIG. 6 illustrates a computer system 600 in block diagram form, which may be used to practice the techniques disclosed in the present invention. The block diagram is a high level conceptual representation and may be implemented in a variety of ways and by various architectures. Bus system 602 interconnects a Central Processing Unit (CPU) 604, Read Only Memory (ROM) 606, Random Access Memory (RAM) 608, storage 610, display 620, audio, 622, keyboard 624, pointer 626, miscellaneous input/output (I/O) devices 628 and interface 629, and communications 630 and interface 632. The bus system 602 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 604 may be a single, multiple, or even a distributed computing resource. Storage 610, may be Compact Disc (CD), Digital Versatile Disk (DVD), hard disks (HD), optical disks, tape, flash, memory sticks, video recorders, etc. Display 620 might be, for example, a Cathode Ray Tube (CRT), Liquid Crystal Display (LCD), a projection system, Television (TV), etc. Communications interface 632 may interface to, for example, a transmitter and/or receiver. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 6 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of skill in the art will immediately appreciate that the invention can be practiced with computer system configurations other than those described, including handheld devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Reference has been made to frequency, timing, phase, chip, chip rate, etc. Some of these terms, as understood by one skilled in the art, are often considered interchangeable and/or having the same essence in differing situations. For example, frequency and timing are related and thus often the specific term used depends on the situation being discussed. What is to be appreciated is that in the art, the words sometimes have meanings commensurate with the surrounding environment, and yet often the words are used interchangeably without respect to the specific structure or environment, i.e. one skilled in the art understands the use and meaning.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for acquiring time and frequency synchronization in a DSSS receiver have been described.

What is claimed is:

1. A method for acquiring frequency and timing synchronization in a communication system comprising:
   (a) receiving a transmitted signal;
   (b) processing the received signal to reduce the frequency offset of the received signal based upon a frequency offset estimate;
   (c) despreading the processed received signal with a first despreading sequence to create a first despread signal;
   (d) despreading the first despread signal with a second despreading sequence to create a second despread signal;
   (e) estimating the frequency offset of the second despread signal to create a frequency offset estimate;
   (f) despreading the second despread signal at a first time offset to create a third despread signal;
   (g) despreading the second despread signal at a second time offset to create a fourth despread signal; and
   (h) comparing the energy of the third and fourth despread signals to determine a second despreading sequence.

2. The method of claim 1 wherein the first despreading sequence is a pseudonoise (PN) sequence.

3. The method of claim 1 wherein the second despreading sequence is a Walsh code of length N.

4. The method of claim 3 wherein the Walsh code index is $2^N-1$.

5. The method of claim 1 wherein the second despreading sequence is determined to be one of a plurality of time shifted sequences.

6. The method of claim 1 wherein (b) through (h) are repeated.

7. The method of claim 6 wherein the length of the second despreading sequence is increased for each repetition.

8. The method of claim 7 wherein the final repetition is that in which the sequence length reaches the length of the second spreading sequence that was used to construct the transmitted signal.

9. The method of claim 6 wherein the received signal (b) is the same received signal for each repetition.

10. The method of claim 6 wherein the received signal (b) is a newly received signal for each repetition.

11. A method comprising:
   (a) acquiring chip synchronization to a signal spread with a code sequence of length K, where $K=2^m$;
   (b) setting an initial detection period of $x=x_0$ chips;
   (c) detecting a partial code symbol of length x chips; and
   (d) if x=K, declaring symbol synchronization, else setting x=x*2 and repeating (c) and (d).

12. The method of claim 11 wherein the code sequence is a Walsh code.

13. The method of claim 12 wherein the Walsh code has an index of K−1.

14. The method of claim 11 wherein the detecting is a plurality of correlations between a received signal and time-shifted versions of the code sequence.

15. The method of claim 14 further comprising choosing the time-shifted code sequence resulting in the highest correlation.

16. The method of claim 14 wherein chip synchronization is accomplished by correlating the received signal with a plurality of time-shifted versions of a pseudonoise code sequence.

17. The method of claim 11 wherein each chip of the signal is further spread by a pseudonoise code sequence.

18. A method for symbol synchronization in a receiver, the method comprising:
   (a) receiving a data sequence signal transmitted at a transmit frequency and having scrambling, modulating, Walsh length=N spreading, and PN sequence length=M spreading;
   (b) combining the received data signal with a local oscillator (LO) operating at a frequency;
   (c) correlating the received data sequence with a locally stored replica of the transmit PN sequence (of length M) to acquire an initial PN sequence alignment with the received data sequence at a PN sequence timing rate;
   (d) estimating a frequency offset between the transmit frequency and the local oscillator frequency, based on a phase difference between the first half of the PN sequence correlation and the second half of the PN sequence correlation and adjusting the local oscillator frequency to make the offset smaller;
   (e) setting a variable X=1;
   (f) correlating a newly received data sequence with the PN sequence and a Walsh code of length $2^X$;
   (g) picking the highest correlation energy in (f) as a new Walsh boundary;
   (h) despreading the newly received data sequence with the Walsh code of length $2^X$ using the PN sequence timing rate over the new Walsh boundary;
   (i) estimating a new frequency offset based on a phase difference between the first half of a PN-Walsh sequence correlation and a second half of the PN-Walsh sequence correlation over a length of $M*2^X$ and adjusting the local oscillator frequency to make the offset smaller;
   (j) determining if $2^X=N$ and if so outputting a signal indicating symbol synchronization in the receiver, else setting X=X+1 and going to (f).

19. The method of claim 18 wherein the Walsh code is a Walsh code index $2^N-1$.

20. The method of claim 18 wherein a data sequence (a) and a newly received data sequence (f) are the same.

21. An iterative sequential method for frequency and timing synchronization of a scrambled, modulated, Walsh length=N spread, and PN sequence length=M spread transmitted signal, said signal received in a receiver, the method comprising:
   (a) acquiring an initial PN synchronization of the received signal based substantially on a locally stored copy of the PN sequence at the receiver;
   (b) calculating a frequency offset between the transmitted signal frequency and a local oscillator frequency by calculating a phase estimate between a signal $X_0(t)$ and $X_1(t)$ where:

$$X_0(t) = \sum_{i=0}^{k-1} (PN_{i\%M} * W_{\lfloor i/M \rfloor} * r_{i+t})$$

$$X_1(t) = \sum_{i=k}^{2k-1} (PN_{i\%M} * W_{\lfloor i/M \rfloor} * r_{i+t})$$

and,
k=M/2, M, 2M, . . . , (N/2)M
   (c) adjusting the local oscillator frequency to provide lower offset
   (d) despreading the received data signal;
   (e) calculating two decision metrics $Z_0$ and $Z_1$, where:

$$Y(t) = X_0(t) + X_1(t)$$

$$Z_0 = \sum_{r=0}^{R-1} (Y[2k*(2r)] - Y[2k*(2r+1)])^2$$

$$Z_1 = \sum_{r=0}^{R-1} (Y[2k*(2r-1)] - Y[2k*(2r+2)])^2$$

(f) choosing the higher of $Z_0$ or $Z_1$ to determine a symbol synchronization; and
   (g) repeating (b) through (f) for k=M/2, M, 2M, . . . , (N/2)M.

22. A processing system comprising a processor, which when executing a set of instructions performs the method of claim 21.

23. A machine-readable medium having stored thereon instructions, which when executed performs the method of claim 21.

24. An apparatus comprising:
   an input coupled to receive a signal;
   a first multiplier having a first input, a second input, and an output, the first input coupled to receive the signal;
   a second multiplier having a first input, a second input, and an output, the first input coupled to receive the first multiplier output, the second input coupled to receive a PN sequence;

a third multiplier having a first input, a second input, and an output, the first input coupled to receive the second multiplier output, a first accumulator having an input and an output, the input coupled to receive the third multiplier output;

a frequency offset estimator having an input and an output, the input coupled to receive the first accumulator output;

a frequency generator having an input and an output, the input coupled to receive the frequency offset estimator output, the output coupled to the first multiplier second input;

a second accumulator having an input and an output, the input coupled to receive the first accumulator output;

a Z-transform block having an input and an output, the input coupled to receive the second accumulator output;

an adder having a positive input, a negative input, and an output, the negative input coupled to receive the Z-transform block output, the positive input coupled to receive the second accumulator output;

a power computation block having an input and an output, the input coupled to receive the adder output;

a third accumulator having an input and an output, the input coupled to receive the power computation output;

a fourth accumulator having an input and an output, and the input coupled to receive the power computation output;

a threshold block having a first input, a second input, and an output, the first input coupled to receive the third accumulator output, the second input coupled to receive the fourth accumulator output;

a symbol timing adjustment block having an input and an output, the input coupled to receive the threshold block output;

a Walsh sequence code generator having an input and an output, the input coupled to receive the output of the symbol timing generator, the output coupled to the second input of the third multiplier; and a symbol detector output signal coupled to receive the first accumulator output.

25. The apparatus of claim 24 wherein the Walsh code is $2^N-1$ where N is the bit length of the Walsh code.

26. The apparatus of claim 25 wherein the PN sequence is of length M and a modulation symbol has a length of N*M chips.

27. An apparatus comprising:
means for receiving a signal;
means for multiplying the signal and a substantially sinusoidal signal at a frequency;
means for despreading the signal with a PN sequence creating a PN-despread signal;
means for despreading the PN-despread signal with a Walsh sequence creating a PW-output;
means for accumulating the PW-output creating Walsh chip sums;
means for frequency offset estimation;
means for generating the frequency;
means for accumulating the Walsh chip sums;
means for performing a Z transform;
means for computing power;
means for accumulating alternating Walsh chip sums;
means for threshold comparison; and
means for adjusting Walsh symbol timing.

28. The apparatus of claim 27 wherein the Walsh code is $2^N-1$ where N is the bit length of the Walsh code.

29. The apparatus of claim 27 wherein the PN sequence is of length M and a modulation symbol has a length of N*M chips.

30. The apparatus of claim 27 implemented by an integrated circuit (IC).

31. A machine-readable medium having stored thereon information representing the apparatus of claim 27.

32. A system comprising a processor, which when executing a set of instructions, performs the following:
receives a signal;
multiplies the signal and a substantially sinusoidal signal at a frequency;
despreads the signal with a PN sequence creating a PN-despread signal;
despreads the PN-despread signal with a Walsh sequence creating a PW-output;
accumulates the PW-output creating Walsh chip sums;
estimates frequency offset;
generates the frequency;
accumulates the Walsh chip sums;
performs a Z transform;
computes power;
accumulates alternating Walsh chip sums;
performs threshold comparison; and
adjusts Walsh symbol timing.

33. The system of claim 32 wherein the Walsh code is $2^N-1$ where N is the bit length of the Walsh code.

34. The system of claim 32 wherein the PN sequence is of length M and a modulation symbol has a length of N*M chips.

35. A method comprising:
receiving input data to be transmitted;
scrambling the input data;
modulating the scrambled input data;
spreading the modulated scrambled input data with a Walsh code $2^N-1$, where N is the bit length of the Walsh code, to create Walsh chips; and
spreading each Walsh chip with a pseudonoise (PN) sequence, of length M, creating an output data sequence signal;
transmitting at a transmit frequency the output data sequence signal to a receiver;
(a) receiving the data sequence signal transmitted at the transmit frequency;
(b) combining the received data signal with a local oscillator (LO) operating at a frequency;
(c) correlating the received data sequence with a locally stored replica of the transmit PN sequence (of length M) to acquire an initial PN sequence alignment with the received data sequence at a PN sequence timing rate;
(d) estimating a frequency offset between the transmit frequency and the local oscillator frequency, based on a phase difference between the first half of the PN sequence correlation and the second half of the PN sequence correlation and adjusting the local oscillator frequency to make the offset smaller;
(e) setting a variable X=1;
(f) correlating a newly received data sequence with the PN sequence and a Walsh code of length $2^X$;
(g) picking the highest correlation energy in (f) as a new Walsh boundary;
(h) despreading the newly received data sequence with the Walsh code of length $2^X$ using the PN sequence timing rate over the new Walsh boundary;

(i) estimating a new frequency offset based on a phase difference between the first half of a PN-Walsh sequence correlation and a second half of the PN-Walsh sequence correlation over a length of $M*2^X$ and adjusting the local oscillator frequency to make the offset smaller;

(j) determining if $2^X=N$ and if so outputting a signal indicating symbol synchronization in the receiver, else setting $X=X+1$ and going to (f).

36. The method of claim 35 wherein the data sequence (a) and a newly received data sequence (f) are the same.

* * * * *